US010223354B2

(12) United States Patent
He et al.

(10) Patent No.: US 10,223,354 B2
(45) Date of Patent: Mar. 5, 2019

(54) UNSUPERVISED ASPECT EXTRACTION FROM RAW DATA USING WORD EMBEDDINGS

(71) Applicant: SAP SE, Walldorf (DE)

(72) Inventors: Ruidan He, Singapore (SG); Daniel Dahlmeier, Singapore (SG)

(73) Assignee: SAP SE, Walldorf (DE)

(*) Notice: Subject to any disclaimer, the term of this patent is extended or adjusted under 35 U.S.C. 154(b) by 35 days.

(21) Appl. No.: 15/478,363

(22) Filed: Apr. 4, 2017

(65) Prior Publication Data

US 2018/0285344 A1 Oct. 4, 2018

(51) Int. Cl.
*G06F 17/00* (2006.01)
*G06F 17/27* (2006.01)

(52) U.S. Cl.
CPC ................................ *G06F 17/2785* (2013.01)

(58) Field of Classification Search
CPC ................................ G06F 17/30; G06F 17/27
See application file for complete search history.

(56) References Cited

U.S. PATENT DOCUMENTS 9,336,776 B2 5/2016 Dahlmeier et al.
2012/0209751 A1* 8/2012 Chen .................... G06Q 30/06 705/27.2
2017/0024455 A1* 1/2017 Powell .............. G06F 17/30598
2017/0103324 A1* 4/2017 Weston .................... G06N 5/02
2017/0193098 A1* 7/2017 Randhawa ........ G06F 17/30705

OTHER PUBLICATIONS

Mikolov et al. "*Efficient Estimation of Word Representations in Vector Space*"; In Proceedings of Workshop at ICLR, 2013; arXiv.org 1301.3781; Pub. Sep. 7, 2013; 12 pages.
Mikolov et al. "*Distributed Representations of Words and Phrases and Their Compositionality*"; Proceeding NIPS'13 of 26$^{th}$ International Conference on Neural Information Processing Systems, arXiv:1310.4546; Pub. Dec. 5, 2013; 9 pages.
Faruqui et al. "*Retrofitting Word Vectors to Semantic Lexicons*"; Human Language Technologies: The 2015 Annual Conference of the North American Chapter of the ACL, pp. 1606-1615, Denver, CO, USA; May 31-Jun. 5, 2015; © 2015 Association for Computational Linguistics.
Ruidan He and Daniel Dahlmeier, "*Simple and Effective Unsupervised Aspect Extraction with Word Embeddings*", 9 pages.

* cited by examiner

*Primary Examiner* — Shreyans A Patel
(74) *Attorney, Agent, or Firm* — Fish & Richardson P.C.

(57) ABSTRACT

Methods, systems, and computer-readable storage media for receiving a vocabulary that includes text data that is provided as at least a portion of raw data, the raw data being provided in a computer-readable file, providing word embeddings based on the vocabulary, the word embeddings including word vectors for words included in the vocabulary, clustering word embeddings to provide a plurality of clusters, each cluster representing an aspect inferred from the vocabulary, determining a respective association score between each word in the vocabulary and a respective aspect, and providing a word ranking for each aspect based on the respective association scores.

17 Claims, 4 Drawing Sheets

300
Receive vocabulary — 302
Provide word embeddings — 304
Incorporate domain knowledge — 306
Cluster word embeddings — 308
Determine association scores — 310
Provide ranked words for aspects — 312

UNSUPERVISED ASPECT EXTRACTION FROM RAW DATA USING WORD EMBEDDINGS

BACKGROUND

Aspect-based sentiment analysis includes the machine processing of text to determine aspects (e.g., topics) that the text refers to, as well as a sentiment conveyed for aspects. Aspect extraction is an important and challenging task in aspect-based sentiment analysis. In some techniques, variants of topic models are adopted to infer aspects (topics) from text in an unsupervised setting. However, the preference for aspects semantic coherence is not directly encoded in topic models. As a result, aspects inferred by topic models can often mix loosely related aspect terms.

SUMMARY

Implementations of the present disclosure include computer-implemented methods for unsupervised aspect extraction from raw data. In some implementations, actions include receiving a vocabulary that includes text data that is provided as at least a portion of raw data, the raw data being provided in a computer-readable file, providing word embeddings based on the vocabulary, the word embeddings including word vectors for words included in the vocabulary, clustering word embeddings to provide a plurality of clusters, each cluster representing an aspect inferred from the vocabulary, determining a respective association score between each word in the vocabulary and a respective aspect, and providing a word ranking for each aspect based on the respective association scores. Other implementations of this aspect include corresponding systems, apparatus, and computer programs, configured to perform the actions of the methods, encoded on computer storage devices.

These and other implementations can each optionally include one or more of the following features: the word embeddings are provided based on one of a skip-gram model, and a continuous-bag-of-words (CBOW) model; actions further include incorporating domain-specific knowledge into the word embeddings using a graph-based learning objective that is used to refine word vectors relative to one another; the association scores are provided in an association strength matrix; the word embeddings are clustered using k-gram clustering; the vocabulary includes fewer words than the raw data; and the raw data includes review data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to aspect extraction from raw data. More particularly, implementations of the present disclosure are directed to unsupervised aspect extraction from raw data using word embeddings. Implementations can include actions of receiving a vocabulary that includes text data that is provided as at least a portion of raw data, the raw data being provided in a computer-readable file, providing word embeddings based on the vocabulary, the word embeddings including word vectors for words included in the vocabulary, clustering word embeddings to provide a plurality of clusters, each cluster representing an aspect inferred from the vocabulary, determining a respective association score between each word in the vocabulary and a respective aspect, and providing a word ranking for each aspect based on the respective association scores.

Figure 1:
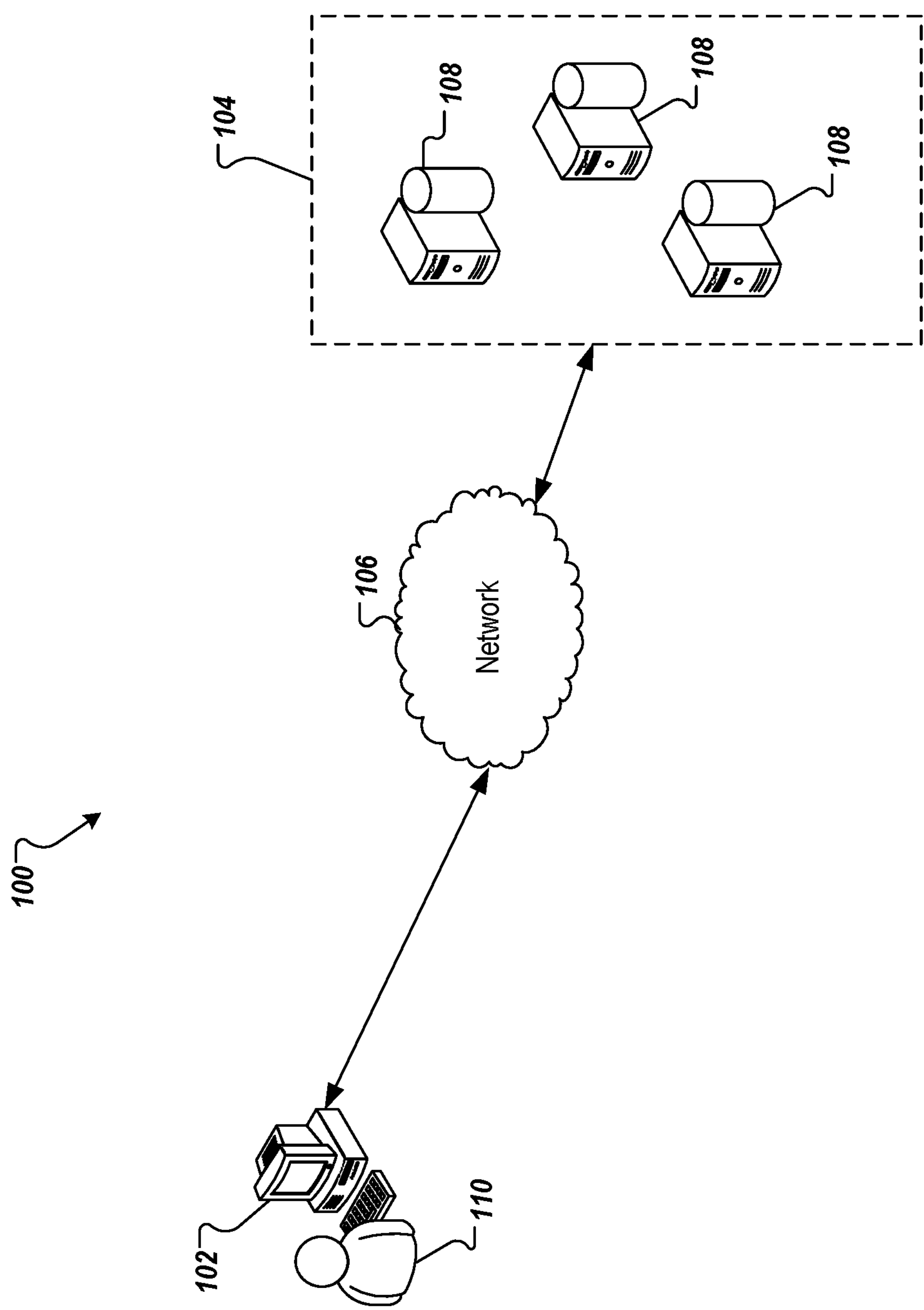
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host an aspect-based sentiment analysis service (e.g., provided as one or more computer-executable programs executed by one or more computing devices). For example, input data can be provided to the server system (e.g., from the client device 102), and the server system can process the input data through the aspect-based sentiment analysis service to provide result data. For example, the server system 104 can send the result data to the client device 102 over the network 106 for display to the user 110.

Implementations of the present disclosure are described in detail herein with reference to an example context. The example context includes aspect extraction and sentiment analysis of textual data including review data. Example review data can include user reviews (e.g., customer reviews) provided as text data, each review capturing a respective user's thoughts, opinion, analysis, critique, and/or sentiment on a domain. Example domains include, without limitation, restaurants, hotels, airlines, food, beverage, theater, products, and services. For example, text data can capture user reviews of a restaurant. As another example, text data can capture user reviews of a product. In some examples, users can submit tens, hundreds, thousands of reviews using, for example, third-party services (e.g., submit reviews to a third-party review service, or online retailer (application; website)), and/or to an application/website of a provider (of the reviewed products/services)). It is contemplated, however, that implementations of the present disclosure can be realized in any appropriate context.

In accordance with the example context, there has been a dramatic growth of user-generated online reviews. With such growth, the ability to automatically understand, extract, and summarize useful information from a large number of reviews has become an important topic, providing both customers and companies with a valuable source of information for decision making. Aspect-based sentiment analysis is one of the main frameworks for sentiment analysis and opinion mining, and enables fine-grained analysis of reviews. A key component of aspect-based sentiment analysis is aspect extraction, which includes multiple steps. In a first step, aspect terms are extracted from a review corpus. In a second step, similar aspect terms are clustered into categories where each category represents a single aspect. For example, in restaurant reviews, aspects may include food, staff, and ambience, and aspect terms for food may include chicken, beef, tomato, pasta, and the like.

In general, previous techniques for aspect extraction can be categorized into three approaches: rule-based, supervised learning, and unsupervised learning. Rule-based aspect extraction generally extracts product features by exploiting frequent nouns and dependency relations. Supervised learning aspect extraction generally treats the task as a sequence labeling problem. Both rule-based and supervised learning techniques have limitations. For example, they are unable to group extracted aspect terms into categories. In addition, supervised learning also suffers from data annotation and domain adaptation problems. That is, for supervised learning, labels must be manually provided to the underlying data, which can be a time and resource (e.g., computing resources) intensive task.

In another approach, unsupervised learning techniques are adopted to avoid reliance on labeled data needed for supervised learning, for example. Generally, the outputs of unsupervised learning are word distributions or rankings for each aspect. Aspects can be directly obtained in this case without performing extraction and categorization separately. In recent years, the so-called Latent Dirichlet Allocation (LDA) has become a popular approach for aspect extraction in unsupervised learning, as LDA has been shown to be efficient at inferring aspects and their representative words from corpora of reviews. Many techniques adopt different LDA-based models. Because the goal is to cluster synonymous aspect terms into the same category, one of the main evaluation criteria is to judge whether the resulting aspects are semantically coherent. However, this preference for semantic coherence is not directly encoded in LDA-based models. Further, aspects inferred by LDA-based models often mix unrelated or loosely related concepts.

In general, the problem of aspect extraction has been well studied in the past decade. Some techniques extract different product features through frequent items mining, and hand-coded rules without supervision. Such techniques have also extracted opinion terms by finding the synonyms and antonyms of opinion seed words through, for example, a lexical database (e.g., WordNet). Following such techniques, other techniques include using pre-defined rules and dependency information to extract product aspects. Despite the fact that those models are unsupervised, they heavily depend on predefined rules, which work well only when the aspect terms are restricted to a small group of nouns. Other techniques model the problem as a standard sequence labeling problem, and propose the use of hidden Markov models, and conditional random fields. However, both rule-based models and supervised models are unable to categorize extracted aspect terms. Additionally, supervised learning requires large amounts of labeled data for training purposes, which can be time and resource intensive.

Unsupervised techniques have been proposed to perform aspect extraction and categorization at the same time. Most existing work is based on LDA, introduced above. For example, one technique proposed a two-step approach by first identifying aspect words using a local LDA (LocLDA), and then identifying aspect-specific opinion words by applying polarity propagation on adjectives. Another technique proposed a MaxEnt-LDA model, which is able to jointly capture both aspect and opinion words. In still another technique, two models were proposed to extract and categorize aspect words and opinion words given some user-specified seeds. In still another technique, a restricted Boltzmann machine (RBM) based model is used to simultaneously extract aspects and relevant sentiments of a given review sentence, treating aspects and sentiments as separate hidden variables in RBM. However, all of these techniques fail to directly encode the preference for semantic coherence, which leads to aspects with loosely related terms.

To overcome the above limitations, implementations of the present disclosure provide unsupervised learning using word embeddings to capture semantic coherence of inferred aspects. In some implementations, distributed word representation is able to capture semantic similarities between words, and has proven to be a fruitful in natural language processing (NLP). In accordance with implementations of the present disclosure, and as described in further detail herein, the problem of aspect extraction is treated as a word clustering problem, and word embeddings are used to infer semantically coherent aspect clusters. In some implementations, word embeddings are trained on a review corpus (i.e., text of reviews), and k-means clustering (referred to herein, as k-means) is executed on the learned word embeddings to obtain word clusters, where each cluster represents an inferred aspect. In some examples, k-means can be generally described as a clustering technique that partitions n observations into k clusters, in which each observation belongs to the cluster with the nearest mean. An association score between each word in the vocabulary and each inferred aspect is determined, and a ranking of words, based on respective scores, can be obtained for each inferred aspect.

In learning word embeddings, a high dimensional numerical vector representation is learned for each word in the vocabulary. In this manner, the relative positions of the words in the vector space capture some of the relationships among the words. The most widely used hypothesis for learning word embeddings is the distributional hypothesis. The distributional hypothesis assumes that words occurring in similar contexts tend to have similar meanings. Word embeddings learned under the distributional hypothesis are able to capture both syntactic and semantic regularities, which can be used both as an end itself for identifying similarities between terms, and as a representational basis for different downstream NLP tasks.

Implementations of the present disclosure include training word embeddings from a review corpus. In some implementations, each sentence is treated as a document when constructing the input. In some examples, one of a continuous bag-of-words (CBOW) model, and a skip-gram model is implemented. Implementations of the present disclosure also enable the incorporation of domain knowledge into the word embeddings. For example, one may expect the words staff, service, waiter, and waitress to cluster into the aspect Staff/Service in restaurant reviews, since these are common words used for describing service. In some implementations, domain knowledge is incorporated by retrofitting word embeddings with specified seed sets, so that the embedding of words in the same seed set are similar to each other. Implementations further include k-means clustering on the word embeddings, where each of the resulting clusters is an inferred aspect. Word rankings of aspects are generated by calculating the association score between each word in the vocabulary and each inferred aspect.

With regard to word embeddings learning and retrofitting, implementations of the present disclosure used Word2vec, which can be described as a group of related models that are used to produce word embeddings. The Word2vec models can be described as shallow, two-layer neural networks that are trained to reconstruct linguistic contexts of words. In some examples, the input to Word2vec is a corpus of text, and the output is a vector space (e.g., of several hundred dimensions) with each unique word in the corpus being assigned a corresponding vector in the space. Word vectors are positioned in the vector space such that words that share common contexts in the corpus are located in close proximity to one another in the space. In some examples, Word2vec offers a choice of models: the skip-gram model, and the CBOW model. In implementations of the present disclosure, the CBOW model provides better performance, as discussed in further detail herein. In some implementations, a negative sampling technique is used to avoid estimating the computationally expensive normalization terms in a normalized exponential function (softmax function).

To incorporate domain knowledge into the word embeddings, a technique for retrofitting word vectors to semantic lexicons is performed. More particularly, the vector space representations are refined using relational information from a semantic lexicon, where linked words have similar vector representations. In some examples, this is achieved by refining the learned word embeddings through a post-hoc graph-based learning objective. In some examples, a graph is constructed from given seed sets by treating each word as a node, and fully connecting the nodes in the same seed set. In this manner, words in the same seed set are neighbors with each other in the constructed graph. Because the word embeddings are to be close to their neighbors, and, at the same time, the useful information learned from distributional hypothesis is to be kept, the objective function to be minimized can be described based on the following relationship:

$$L(V)=\sum_{i=1}^{N}\left[\alpha_i\|v_i-\hat{v}_i\|^2+\sum_{(i,j)\in E}\beta_{ij}\|v_i-v_j\|^2\right]$$

where $V=(v_1, \ldots, v_N)$ represents refined word vectors, $\hat{V}=(\hat{v}_1, \ldots, \hat{v}_N)$ represents the original word vectors (e.g., provided from Word2vec), E represents edges in the constructed graph, and $\alpha_i$ and $\beta_{ij}$ are relative strengths of association (e.g., $\alpha_i=1$; $\beta_{ij}=\text{degree}(\text{node}_i)^{-1}$).

In some examples, the objective function can be described as being convex in V. An iterative updating can be used for optimization, where each time only one vector in V is updated and the other vectors are treated as constants. The vectors in V are initialized to be equal to the vectors in $\hat{V}$. In each iteration, for every vector $v_i$, the first derivative of L is taken with respect to the respective vector, which is updated by equating the derivative to zero in accordance with the following example relationship:

$$v_i=\frac{\sum_{j:(i,j)\in E}\beta_{ij}v_j+\alpha_i\hat{v}_i}{\sum_{j:(i,j)\in E}\beta_{i,j}+\alpha_i}$$

In some examples, this is executed over multiple iterations (e.g., 10 iterations).

As introduced above, an association score is calculated. In some examples, the association score is determined as between each word in the vocabulary and each inferred aspect. In some implementations, an objective is to detect T aspects and construct an association strength matrix F with dimension V×T, where V is the vocabulary size (e.g., unique words in the corpus; removing punctuation symbols, stop words, and words appearing less than X times (10 times)). Each entry $F_{ij}$ represents the association score between word i and aspect j. In some implementations, k-means is executed to cluster word embeddings into T groups. In some examples, each cluster j is represented with its centroid vector $c_j$. The association strength matrix F is populated by taking $F_{ij}$ as the cosine similarity between word vector $v_{w_i}$ and centroid vector $c_j$ based on the following example relationship:

$$F_{ij} = \left(\frac{v_{w_i}}{\|v_{w_i}\|}\right)^T \cdot \frac{c_j}{\|c_j\|}$$

In some examples, each column vector $F_j$ in matrix F can be regarded as a distribution of words under aspect j. It can be noted that the column vectors in matrix F do not adhere to the constraints that all entries in a column vector sum to one.

Figure 2:
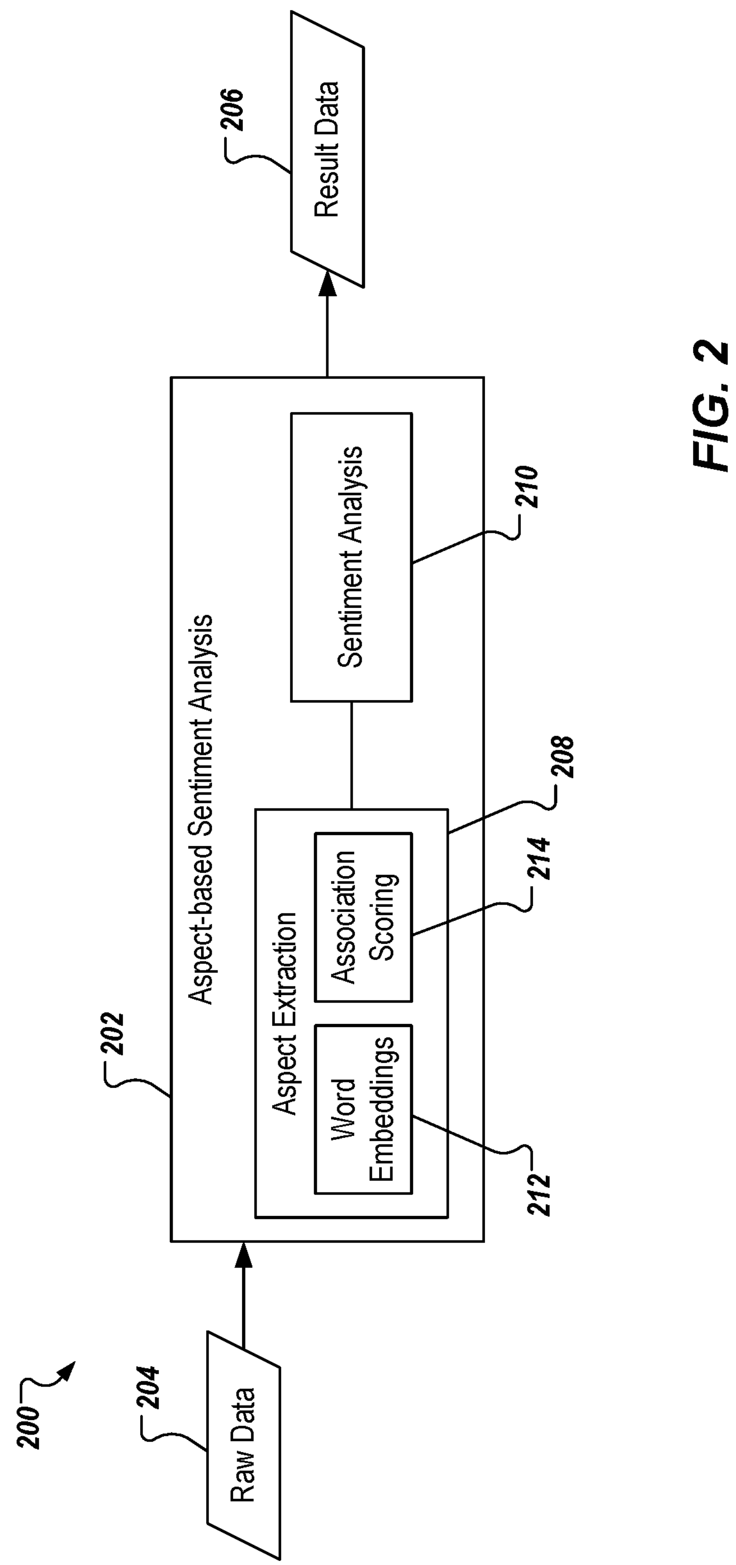
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an aspect-based sentiment analysis module 202 that receives raw data 204 and provides result data 206. In the depicted example, the aspect-based sentiment analysis module 202 includes an aspect extraction sub-module 208, and a sentiment analysis sub-module 210. In some examples, the raw data 204 is provided as a text corpus (e.g., review text), and the aspect extraction sub-module 208 extracts aspects therefrom using the aspect extraction of the present disclosure, as described herein. In some examples, the sentiment analysis sub-module 210 processes the extracted aspects, and at least a portion of the raw data 204 to determine respective sentiments for each aspect. In some examples, the result data 206 includes aspects and their respective sentiments.

In the example of FIG. 2, and in accordance with implementations of the present disclosure, the aspect extraction sub-module 208 includes a word embeddings sub-module 212, and an association scoring sub-module 214. In some examples, the word embeddings sub-module 212 performs word embeddings in accordance with implementations of the present disclosure. For example, the word embeddings sub-module 204 processes at least a portion of the raw date 204 (e.g., using Word2vec) to provide word embeddings, as described herein. In some examples, the association scoring sub-module 214 processes the word embeddings and at least a portion of the raw data 204 to provide an association strength matrix F, as described herein.

Figure 3:
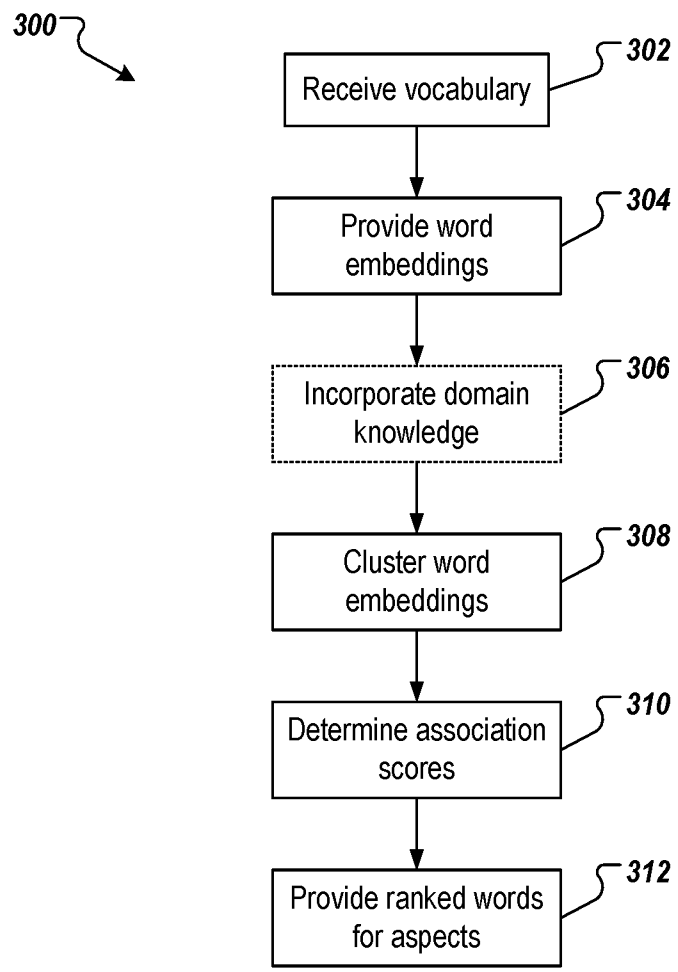
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices. In some examples, the example process 300 is executed for aspect extraction (inferring aspects) in an aspect-based sentiment analysis.

A vocabulary is received (302). In some examples, the aspect extraction sub-module 208 of the aspect-based sentiment analysis module 202 of FIG. 2 receives the vocabulary. For example, the vocabulary includes text data that is provided as at least a portion of raw data, the raw data being provided in a computer-readable file. In some examples, the raw data includes review data, as described by way of example herein. In some examples, the raw data is processed to provide the vocabulary. For example, a pre-processing module (not shown) of the aspect-based sentiment analysis module 202 can process the raw data (e.g., identify unique words in the corpus; removing punctuation symbols, stop words, and words appearing less than X times (10 times)) to provide the vocabulary to the aspect extraction sub-module 208. In some examples, the aspect extraction sub-module 208 can process the raw data to provide the vocabulary.

Word embeddings are provided based on the vocabulary (212). In some examples, the word embeddings sub-module 212 provides the word embeddings, as described herein (e.g., using Word2vec). In some examples, the word embeddings include word vectors for words included in the vocabulary. Domain knowledge can be incorporated into the word embeddings (306). In some examples, domain knowledge is incorporated using a graph-based learning objective that is used to refine word vectors relative to one another, as described herein. In some examples, incorporating domain knowledge can be optional (as denoted by dashed lines in FIG. 3).

The word embeddings are clustered to provide a plurality of clusters (308). For example, the aspect extraction sub-module 208 clusters the word embeddings. In some examples, each cluster represents an aspect inferred from the vocabulary. In some examples, clustering is performed using k-means clustering. Association scores are determined (310). For example, the association scoring sub-module 214 determines the association scores. In some examples, and as described in detail herein, a respective association score between each word in the vocabulary and a respective aspect is determined. A word ranking for each aspect based on the respective association scores (214).

Implementations of the present disclosure have been evaluated for performance using example test data. A summary of such evaluations is provided herein. In general, the performance evaluations were conducted for three variants of implementations of the present disclosure: (1) word embeddings using the skip-gram model (SG); (2) word embeddings using the CBOW model (CBOW); and (3) word embeddings that are trained using the CBOW model, then retrofitting the word embeddings to semantic lexicons (CBOW+retro).

The example test data included real-world datasets: Citysearch corpus, and BeerAdvocate corpus. The Citysearch corpus can be described as a widely used restaurant review corpus, which contains over 50,000 restaurant reviews from Citysearch New York. A subset of 3,400 sentences of the Citysearch corpus with manually labeled aspects is available. These annotated sentences are used for evaluation of the aspect extraction of implementations of the present disclosure. In the subset, there are six manually defined aspect labels: Food, Staff, Ambience, Price, Anecdotes, and Miscellaneous. The BeerAdvocate corpus can be described as a beer review corpus, which contains over one million reviews. A subset of 1,000 reviews, corresponding to 9,245 sentences of the BeerAdvocate corpus, are annotated with aspect labels. There are five manually defined aspect labels: Feel, Look, Smell, Taste, and Overall.

For each corpus, punctuation symbols, stop words, and words appearing less than 10 times in the corpus were removed. As described herein, Word2vec was used for training word embeddings. In the performance evaluation, the embedding size was set to 200, the window size was set to 5, and the negative sample size was set to 5. For the both the Citysearch corpus, and the BeerAdvocate corpus, the number of aspects was to 14. Further, each inferred aspect was manually mapped to one of the gold-standard aspects according to their top ranked representative words for both datasets.

For qualitative evaluation of aspect inference, aspects inferred using implementations of the present disclosure were compared to aspects inferred using each of LocLDA, and k-means that is executed directly on a word co-occurrence matrix, in which each word is represented by a related row vector in the co-occurrence matrix. Table 1 presents all 14 aspects inferred by implementations of the present disclosure for the restaurant domain (Citysearch corpus). Compared to gold-standard labels, the inferred aspects are more fine-grained. For example, implementations of the present disclosure distinguish main dishes from desserts. Although aspect words and opinion words are not explicitly separated in implementations of the present disclosure, they tend to appear in different inferred aspect groups as shown in Table 1.

TABLE 1

| Inferred Aspects using Implementations of the Present Disclosure | | |
|---|---|---|
| Inferred Aspects | Representative Words | Gold Aspects |
| Main Dishes | tomato, potato, pork, chicken, tuna, vegetable | Food |
| Dessert | chocolate, cream, banana, cake, pudding, coconut | |
| General | cuisine, american, traditional, Japanese, authentic, flavorful | |
| Physical Ambience 1 | wall, lighting, ceiling, wood, music, floor | Ambience |
| Physical Ambience 2 | table, downstairs, lounge, booth, candle, ambience | |
| Adjectives | intimate, comfortable, spacious, noisy, crowd, romantic | |
| Staff | manager, rude, hostess, host, waiter, asked | Staff |
| Service | minute, asked, told, seated, waited, table | |
| Price | charge, paid, bill, reservation, came, dollar | Price |
| Anecdotes 1 | go, eat, leave, somewhere, won, know | Anecdotes |
| Anecdotes 2 | birthday, week, friday, party, recently, weekend | |
| Location | park, street, village, avenue, manhattan, brooklyn | Misc. |
| Mixed | aged, bass, white, roasted, chair, goat | |
| General | excellent, great, enjoyed, best, wonderful, fantastic | |

Table 2 depicts the top-ranked aspect words discovered by the three models (CBOW of the present disclosure, LocLDA, and k-means) for three aspects, which gives an intuitive feel of the results rom different models. In the performance evaluations, the number of inferred aspects was set to 14 for all three models. Because, in this case, multiple inferred aspects can belong to the same gold standard label, due to space limitation, only the most representative aspect for each true label was selected for inclusion in Table 2. Words that are inappropriately clustered are italicized. Because implementations of the present disclosure do not focus on separating aspect words and opinion words, a sentiment word is considered as correct as long as it is relevant to the respective aspect.

TABLE 2

| Top 15 Aspect Words in Three Selected Aspects | | | | | | | | |
|---|---|---|---|---|---|---|---|---|
| Food | | | Staff | | | Ambience | | |
| CBOW | LocLDA | k-means | CBOW | LocLDA | k-means | CBOW | LocLDA | k-means |
| tomato | chicken | chicken | manager | service | table | wall | room | *scene* |
| sauce | salad | sauce | hostess | staff | asked | wood | bar | dark |
| onion | steak | salad | waiter | friendly | waitress | ceiling | *restaurant* | *set* |
| chicken | dish | meat | rude | waiter | host | floor | *like* | *spacious* |
| mushroom | sauce | shrimp | waitress | attentive | manager | window | *dining* | wall |
| grilled | appetizer | dish | server | wait | told | room | decor | floor |
| beef | shrimp | salmon | staff | *always* | waiter | lighting | *place* | space |
| pork | delicious | stuffed | host | server | *got* | space | *nice* | *front* |
| roasted | soup | vegetable | waitstaff | *food* | maitre | dark | music | area |
| tuna | *like* | grilled | owner | *nice* | *didn* | candle | atmosphere | open |
| bean | *ordered* | sweet | bartender | waitress | *another* | lounge | space | *sit* |
| salmon | fish | beef | helpful | owner | *given* | seating | wall | *patron* |
| fried | pasta | duck | polite | rude | help | booth | *feel* | interior |
| shrimp | also | sausage | *customer* | slow | *could* | brick | *small* | bright |
| spinach | *rice* | mushroom | attentive | *make* | *ready* | inside | romantic | lounge |

As can be seen in Table 2, CBOW provides the best performance and is able to discover highly aspect-specific words, particularly for Staff and Ambience compared. It can be noted that, although k-means alone is very simple, it performs quite well. This is because the representations of words in the co-occurrence matrix also encode the distributional hypothesis to some extent, while the word embeddings learned by Word2vec capture even better semantic regularities.

For quantitative evaluation of the resulting aspects discovered by the different methods, precision@n (p@n) is used to evaluate the word rankings, where n is a rank position. Table 3 shows the results of the three models for three major aspects of the restaurant domain.

TABLE 3

| Average p@n for Three Selected Aspects | | | | |
|---|---|---|---|---|
| Aspect | Method | p@20 | p@30 | p@50 |
| Food | CBOW | 1.000 | 1.000 | 0.987 |
| | LocLDA | 0.750 | 0.767 | 0.710 |
| | k-means | 0.950 | 0.967 | 0.880 |
| Staff | CBOW | 0.850 | 0.816 | 0.710 |
| | LocLDA | 0.525 | 0.450 | 0.490 |
| | k-means | 0.700 | 0.733 | 0.460 |

TABLE 3-continued

| Average p@n for Three Selected Aspects | | | | |
|---|---|---|---|---|
| Aspect | Method | p@20 | p@30 | p@50 |
| Ambience | CBOW | 0.950 | 0.917 | 0.880 |
| | LocLDA | 0.750 | 0.767 | 0.720 |
| | k-means | 0.900 | 0.867 | 0.780 |

For each gold-standard aspect, p@n shown in Table 3, p@n was calculated by averaging the results of all inferred aspects that mapped to it. From the results, it is apparent that implementations of the present disclosure outperform the other methods by relatively large margins for all ranked buckets, which demonstrates the power brought by vector representation of words.

The performance of sentence-level aspect identification was evaluated on both the restaurant domain and the beer domain using the annotated sentences of the respective corpora (i.e., 3,400 manually labeled sentences for the Citysearch corpus; 9,245 manually labeled sentences for the BeerAdvocate corpus). The evaluation criterion is to judge how well the predictions match the true labels, measured by precision, recall, and $F_1$ scores. Given a review sentence, a gold-standard aspect is assigned based on the following example relationships:

$$s = \operatorname*{argmax}_{s} \sum_{w \in sentence} \text{score}(w, s)$$

$$\text{score}(w, s) = \frac{1}{m_s} \sum_{j \in s} F_{wj}$$

where score(w, s) denotes the association score between word w and gold-standard aspect s, $m_s$ denotes the total number of inferred aspects that are mapped to aspect s, and $F_{wj}$ is the association score between w and inferred aspect j, which can be found in the association matrix F.

With regard to the restaurant domain, single-label sentences were used for the performance evaluation to avoid ambiguity. Approximately 83% of labeled sentences have a single label. Further, three major aspects, namely, Food, Staff, and Ambience, were evaluated. Other aspects do not show clear patterns in either word usage or writing style, which can make those aspects difficult for even humans to identify. Results achieved using implementations of the present disclosure are compared with those of other published models, including MaxEnt-LDA (ME-LDA), SAS, and SERBM. In can be noted that SERBM has achieved state-of-the-art results for aspect identification on the restaurant corpus to date. The results for the restaurant domain are provided in Table 4.

TABLE 4

Aspect Identification - Restaurant Domain

| Aspect | Method | Precision | Recall | $F_1$ |
|---|---|---|---|---|
| Food | LocLDA | 0.898 | 0.648 | 0.753 |
| | ME-LDA | 0.874 | 0.787 | 0.828 |
| | SAS | 0.867 | 0.772 | 0.817 |
| | SERBM | 0.891 | 0.854 | 0.872 |
| | k-means | 0.976 | 0.368 | 0.534 |
| | SG | 0.974 | 0.549 | 0.702 |
| | CBOW | 0.977 | 0.563 | 0.714 |
| | CBOE + retro | 0.981 | 0.688 | 0.808 |
| Staff | LocLDA | 0.804 | 0.585 | 0.677 |
| | ME-LDA | 0.779 | 0.540 | 0.638 |
| | SAS | 0.774 | 0.556 | 0.647 |
| | SERBM | 0.819 | 0.582 | 0.680 |
| | k-means | 0.421 | 0.714 | 0.530 |
| | SG | 0.773 | 0.707 | 0.738 |
| | CBOW | 0.837 | 0.628 | 0.718 |
| | CBOE + retro | 0.757 | 0.724 | 0.740 |
| Ambience | LocLDA | 0.603 | 0.677 | 0.638 |
| | ME-LDA | 0.773 | 0.588 | 0.668 |
| | SAS | 0.780 | 0.542 | 0.640 |
| | SERBM | 0.805 | 0.592 | 0.682 |
| | k-means | 0.503 | 0.761 | 0.605 |

TABLE 4-continued

Aspect Identification - Restaurant Domain

| Aspect | Method | Precision | Recall | $F_1$ |
|---|---|---|---|---|
| | SG | 0.899 | 0.566 | 0.694 |
| | CBOW | 0.775 | 0.713 | 0.743 |
| | CBOE + retro | 0.848 | 0.669 | 0.748 |

From Table 4, the following observations can be provided. In a first observation, all three variants of the present disclosure perform well for aspects Staff and Ambience. Although the results of SERBM were obtained based on prior knowledge, implementations of the present disclosure are still able to outperform SERBM with $F_1$ scores improvements of 6.0% and 6.6% for Staff and Ambience, respectively. Compared to other models, the $F_1$ scores of implementations of the present disclosure yield relative improvements by approximately 10% on these aspects. In a second observation, the retrofitting process improves $F_1$ scores on all three aspects, especially for Food. This is because the original word embedding of food is not very close to the word embeddings of other words such as chicken, bread, pasta, etc. As a result, the methods CBOW and SG failed to identify sentences with only the word food as related to the aspect Food. The problem is solved if food is included in the seed set for Food. In a third observation, the $F_1$ score for Food using implementations of the present disclosure is not as high, while the precision is very high—almost close to one. It was determined that most of the sentences that were failed to recognize for Food are general descriptions without specific food words appearing. Examples include: A cool bar with great food; The food is prepared quickly and efficiently.

The true labels for both example sentences are Food. CBOW+retro assigns Miscellaneous to the first example sentence, although the word food has a high association score with Food after retrofitting. This is because the words cool and great are general adjectives that have high association scores with Miscellaneous. CBOW+retro assigns Staff to the second example sentence, as the words quickly and efficiently are more related to Staff. In fact, although the second example sentence contains the word food, it is a rather general description of service.

With regard to the beer domain, implementations of the present disclosure are compared s with LocLDA, and a PALE LAGER (PL) model, which reported state-of-the-art results obtained by PALE LAGER on the beer corpus. Both LocLDA and PL models take a number of hours to train on the data set, while implementations of the present disclosure only requires a few minutes to train. Accordingly, implementations of the present disclosure are also less resource intensive (e.g., in terms of computing resources) than the LocLDA and PL models. The results for the beer domain are shown in Table 5.

TABLE 5

Aspect Identification - Beer Domain

| Aspect | Method | Precision | Recall | $F_1$ |
|---|---|---|---|---|
| Feel | PL | 0.789 | 0.763 | 0.776 |
| | LocLDA | 0.938 | 0.528 | 0.675 |
| | CBOW | 0.690 | 0.895 | 0.779 |
| Taste | PL | 0.628 | 0.794 | 0.701 |
| | LocLDA | 0.399 | 0.659 | 0.497 |
| | CBOW | 0.573 | 0.873 | 0.692 |

TABLE 5-continued

| Aspect Identification - Beer Domain | | | | |
|---|---|---|---|---|
| Aspect | Method | Precision | Recall | $F_1$ |
| Smell | PL | 0.779 | 0.672 | 0.722 |
| | LocLDA | 0.550 | 0.439 | 0.488 |
| | CBOW | 0.851 | 0.238 | 0.371 |
| Taste + Smell | PL | 0.809 | 0.903 | 0.854 |
| | LocLDA | 0.652 | 0.871 | 0.746 |
| | CBOW | 0.896 | 0.872 | 0.884 |
| Look | PL | 0.799 | 0.796 | 0.797 |
| | LocLDA | 0.976 | 0.651 | 0.781 |
| | CBOW | 0.945 | 0.860 | 0.901 |
| Overall | PL | 0.638 | 0.778 | 0.702 |
| | LocLDA | 0.540 | 0.693 | 0.607 |
| | CBOW | 0.696 | 0.723 | 0.710 |

In addition to the five gold-standard aspect labels, Taste and Smell were combined to form a single aspect—Taste+Smell. This is because the word rankings for these two aspects are very similar and many words can be used to describe both aspects. For example, the words spicy, bitter, fresh, sweet are top ranked words in both aspects, which makes it difficult for even humans to distinguish them. Because Taste and Smell are highly correlated and difficult to separate in real life, it was determined to treat them as a single aspect. From Table 5, it can be seen that implementations of the present disclosure significantly outperform LocLDA in $F_1$ scores on most aspects. Due to the issue discussed above, both LocLDA and implementations of the present disclosure perform worse than PL on Taste and Smell. However, when these two aspects are combined, implementations of the present disclosure outperform PL in $F_1$ score. Accordingly, the experimental results demonstrate the capability of implementations of the present disclosure in identifying separable aspects.

Figure 4:
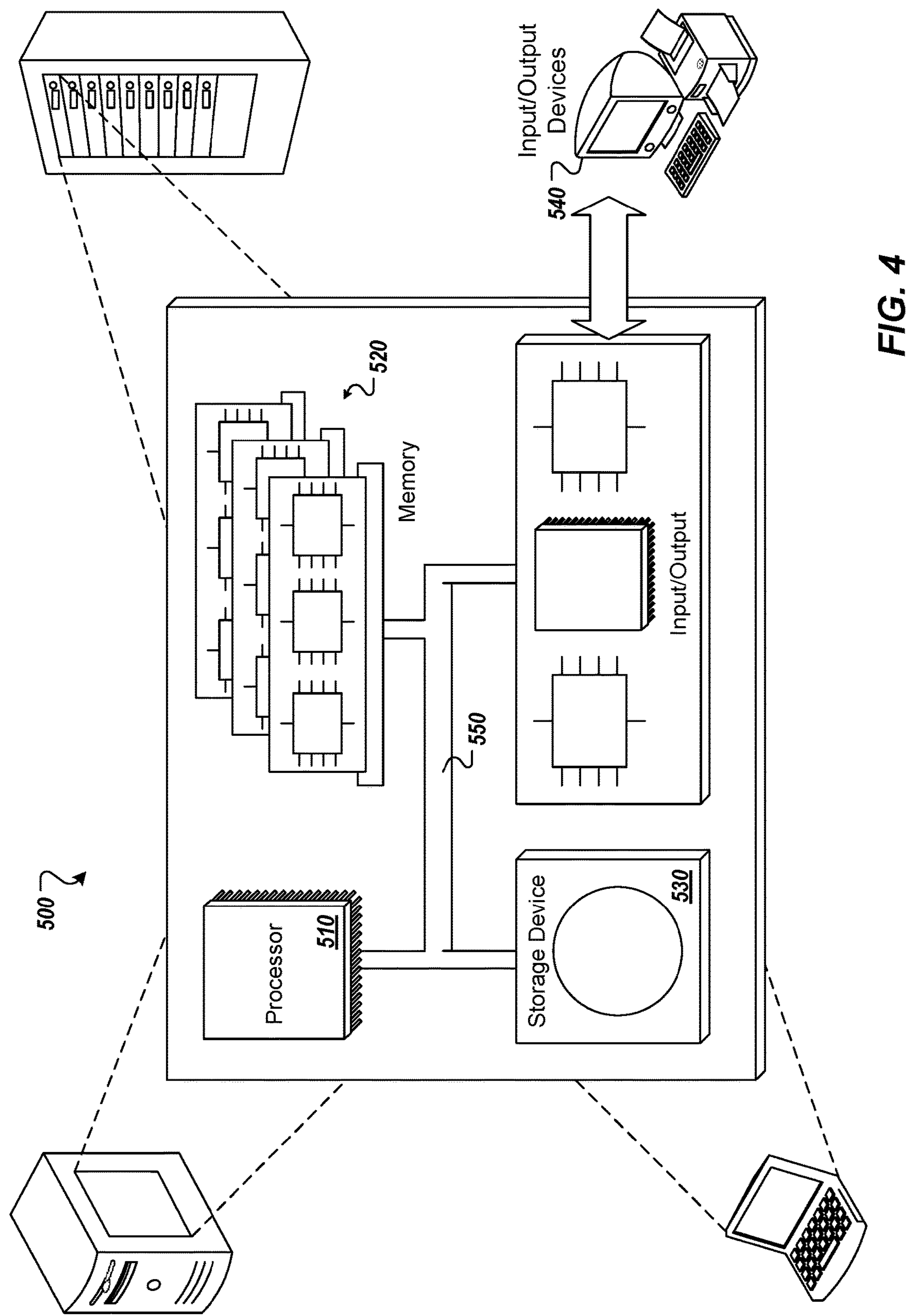
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for unsupervised learning including aspect extraction from raw data to train a model, the method being executed by one or more processors and comprising:

receiving, by the one or more processors, a vocabulary, the vocabulary comprising text data that is provided as at least a portion of raw data, the raw data being provided in a computer-readable file;

providing, by the one or more processors, word embeddings based on the vocabulary, the word embeddings comprising word vectors for words included in the vocabulary;

clustering, by the one or more processors, word embeddings to provide a plurality of clusters, each cluster representing an aspect inferred from the vocabulary;

determining, by the one or more processors, an association strength matrix having dimension V×T, where V is a vocabulary size, and T is a number of aspects inferred from the vocabulary, each entry in the association strength matrix comprising a respective association score between each word in the vocabulary and a respective aspect based on a word vector and a centroid vector; and providing, by the one or more processors, a word ranking for each aspect based on the respective association scores.

2. The method of claim 1, wherein the word embeddings are provided based on one of a skip-gram model, and a continuous-bag-of-words (CBOW) model.

3. The method of claim 1, further comprising incorporating domain-specific knowledge into the word embeddings using a graph-based learning objective that is used to refine word vectors relative to one another.

4. The method of claim 1, wherein the word embeddings are clustered using k-gram clustering.

5. The method of claim 1, wherein the vocabulary comprises fewer words than the raw data.

6. The method of claim 1, wherein the raw data comprises review data.

7. A non-transitory computer-readable storage medium coupled to one or more processors and having instructions stored thereon which, when executed by the one or more processors, cause the one or more processors to perform operations for unsupervised learning including aspect extraction from raw data to train a model, the operations comprising:

receiving a vocabulary, the vocabulary comprising text data that is provided as at least a portion of raw data, the raw data being provided in a computer-readable file;

providing word embeddings based on the vocabulary, the word embeddings comprising word vectors for words included in the vocabulary;

clustering word embeddings to provide a plurality of clusters, each cluster representing an aspect inferred from the vocabulary;

determining an association strength matrix having dimension V×T, where V is a vocabulary size, and T is a number of aspects inferred from the vocabulary, each entry in the association strength matric comprising a respective association score between each word in the vocabulary and a respective aspect based on a word vector and a centroid vector; and providing a word ranking for each aspect based on the respective association scores.

8. The computer-readable storage medium of claim 7, wherein the word embeddings are provided based on one of a skip-gram model, and a continuous-bag-of-words (CBOW) model.

9. The computer-readable storage medium of claim 7, wherein operations further comprise incorporating domain-specific knowledge into the word embeddings using a graph-based learning objective that is used to refine word vectors relative to one another.

10. The computer-readable storage medium of claim 7, wherein the word embeddings are clustered using k-gram clustering.

11. The computer-readable storage medium of claim 7, wherein the vocabulary comprises fewer words than the raw data.

12. The computer-readable storage medium of claim 7, wherein the raw data comprises review data.

13. A system, comprising:

a computing device; and a computer-readable storage device coupled to the computing device and having instructions stored thereon which, when executed by the computing device, cause the computing device to perform operations for unsupervised learning including aspect extraction from raw data to train a model, the operations comprising:

receiving a vocabulary, the vocabulary comprising text data that is provided as at least a portion of raw data, the raw data being provided in a computer-readable file;

providing word embeddings based on the vocabulary, the word embeddings comprising word vectors for words included in the vocabulary;

clustering word embeddings to provide a plurality of clusters, each cluster representing an aspect inferred from the vocabulary;

determining an association strength matrix having dimension V×T, where V is a vocabulary size, and T is a number of aspects inferred from the vocabulary, each entry in the association strength matric comprising a respective association score between each word in the vocabulary and a respective aspect based on a word vector and a centroid vector; and providing a word ranking for each aspect based on the respective association scores.

14. The system of claim 13, wherein the word embeddings are provided based on one of a skip-gram model, and a continuous-bag-of-words (CBOW) model.

15. The system of claim 13, wherein operations further comprise incorporating domain-specific knowledge into the word embeddings using a graph-based learning objective that is used to refine word vectors relative to one another.

16. The system of claim 13, wherein the word embeddings are clustered using k-gram clustering.

17. The system of claim 13, wherein the vocabulary comprises fewer words than the raw data.

* * * * *